Jan. 28, 1930.                    W. KLEINOW                    1,745,170
                                    TENDER
                               Filed Dec. 16, 1927
Fig.1.
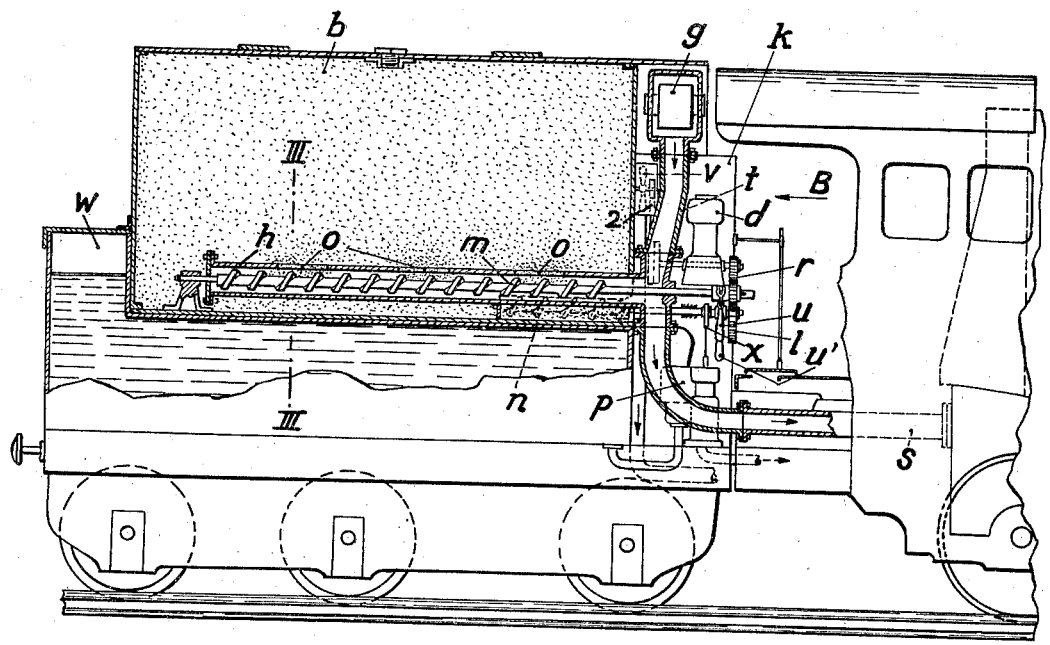
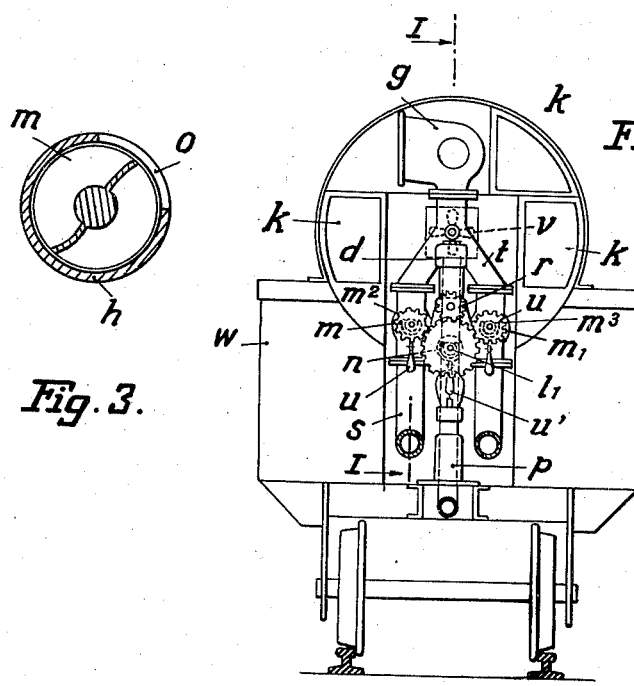
Fig.3.
Fig.2.
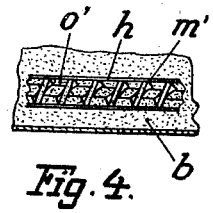
Fig.4.
Inventor:
Walter Kleinow
by
Atty.

Patented Jan. 28, 1930

1,745,170

UNITED STATES PATENT OFFICE

WALTER KLEINOW, OF HENNIGSDORF, NEAR BERLIN, GERMANY, ASSIGNOR TO THE FIRM ALLGEMEINE ELEKTRICITATS-GESELLSCHAFT, OF BERLIN, GERMANY

TENDER

Application filed December 16, 1927, Serial No. 240,439, and in Germany December 14, 1926.

My invention relates to tenders for pulverulent fuel and in particular to the tank in which the fuel is stored on the tender. It is an object of my invention to provide a tender having a fuel tank which combines maximum capacity with maximum resistance to inside pressure without interfering with the sight of the track to the rear of the tender.

To this end instead of the usual tanks of substantially polygonal cross section having inclined walls, I design my tank as a cylinder which is supported in a suitable saddle-shaped recess on the top of the water tank. The axis of the fuel tank is arranged in the central vertical plane of the tender and its diameter is such as to afford an unobstructed sight of the track from the cab of the locomotive on either side of the tank.

Preferably the fuel tank is so arranged that its centre of gravity coincides with the resultant of the loads on the several axles of the tender so that the weight of the tank is distributed uniformly on the axles. In a preferred embodiment of my invention the length of the fuel tank is equal or substantially equal to the wheel base of the tender, and the tank is so arranged that its end walls extend vertically or substantially vertically above the leading and trailing axles of the tender.

In the drawings affixed to this specification and forming part thereof a tender having a fuel tank and accessories embodying my invention is illustrated diagrammatically by way of example.

In the drawings—

Fig. 1 is an elevation of the tender and tank, partly broken away and in section on the line I—I in Fig. 2, Fig. 2 is an elevation of the tender, viewed in the direction of the arrow B in Fig. 1, Fig. 3 is a section of one of the conveyers in the fuel tank and in section on the line III—III in Fig. 1, drawn to a larger scale, Fig. 4 is a part elevation showing one of the conveyers modified.

Referring to the drawings, $w$ is the water tank of a tender which is here shown with six wheels, and $b$ is the fuel tank which is supported in a saddle-shaped depression in the top of the water tank so that it does not project beyond the loading gauge and also affords unobstructed sight of the track from the cab of the locomotive. As shown, the length of the fuel tank is substantially equal to the wheel base of the tender and its end walls are arranged substantially vertically above the leading and trailing axles of the tender.

$m$, $m'$ are two principal conveyers for normal operation and $n$ is an auxiliary conveyer for a stand-by burner. The principal conveyers $m$, $m'$ are pitched at either side of the central plane of the tender and the auxiliary conveyer $n$ is arranged in the central plane and below the two other conveyers so that their axes form a triangle as shown in Fig. 2, with $n$ at the apex. The principal conveyers $m$, $m'$ extend substantially through from the front to the rear end of the fuel tank while the length of the auxiliary conveyer $n$ is only about one-third of the length of the principal conveyers. The casings $h$ of the principal conveyers are provided with slots $o$ for the admission of the fuel, as shown in Fig. 3. The slots $o$ are arranged at convenient points along the casings, for instance near their front and rear ends and centrally between their ends, the object of this arrangement being to relieve the conveyers of the pressure of the fuel except at the comparatively small areas of the slots $o$ so that the power required for driving the conveyers is reduced in proportion, for obviously, with a conveyer subjected to the load of the fuel throughout its length, the power consumption would be very heavy.

Preferably the slots $o$ are arranged at one side of the vertical central plane of the conveyers so that their upper edges extend in that plane, as in this manner the conveyers are partly relieved of the load at the slots. Instead of separate slots a single slot $o'$ extending throughout the length of the casing $h$ might be provided, as shown in Fig. 4. Preferably the peripheral angle of the slots is about 90 degs. so that about a quarter of the perimeter of the conveyers is exposed at the slots. By suitably arranging slots, or a single slot, as described; the uniform distribution of the fuel with respect to the conveyers will not be interfered with.

It is understood that I am not limited to any particular arrangement, number and area of slots.

$d$ is a suitable engine, for instance, a steam engine supplied from the boiler of the locomotive through a flexible pipe line, not shown. $r$ is a pinion on the crank shaft of the engine $d$, $l$ is a gear wheel on the shaft $l'$ of the auxiliary conveyer $n$ which is meshing with the pinion $r$ and $m^2$ and $m^3$ are pinions on the shafts of the conveyers $m$, $m'$ which are also meshing with the gear wheel $l$. It will be understood that the principal conveyers rotate in the same direction and not in opposite directions, as is the rule in apparatus of this kind, and this greatly simplifies the gearing required. $u$ are clutches for connecting the pinions of the principal conveyers with their respective pinions $m^2$, $m^3$, and $u'$ is a clutch for connecting the gear wheel $l$ with the shaft $l'$ of the auxiliary conveyer $n$.

$g$ is a blower which supplies compressed air to the principal conveyers through a breech $t$ and is rotated by a steam turbine or other suitable engine, not shown. The air from the breech mixes with the fuel fed by the conveyers and is conducted to the furnace of the locomotive through pipes $s$.

$p$ is a cooling water pump by which water is drawn from the tank $w$ and circulated about the burner nozzles. The nozzles and the circulating pipes for the cooling water are not illustrated. The pump $p$ is operated by an eccentric $x$ on the shaft $l'$, or by some other suitable means. When the locomotive is standing by, only the auxiliary conveyer is operated and supplied with air by means of a small blower $v$ which is operated from the engine $d$ through the medium of a belt 2. When it is desired to operate the auxiliary conveyer and its burner, the clutches $u$, $u$ of the principal conveyers are thrown out and the clutch $u'$ of the auxiliary conveyer is thrown in.

The machinery except the circulating pump $p$ is arranged in a shelter formed by the extended barrel of the fuel tank $b$, by which it is protected. The spaces not occupied by the machinery are utilized for tool boxes or other containers $k$.

I wish it to be understood that I do not desire to be limited to the exact details of construction shown and described for obvious modifications will occur to a person skilled in the art.

The term "cylindrical" used in the claims is intended to include all similar cross sections.

I claim:—

1. A locomotive tender comprising a horizontally disposed substantially cylindrical fuel tank arranged on said tender with its axis in the vertical central plane thereof, and a water tank below said fuel tank, the diameter of said fuel tank being proportioned to the width of said tender so as to afford unobstructed sight of the track on either side of said tank.

2. A locomotive tender comprising a substantially cylindrical fuel tank arranged on said tender with its axis in the vertical central plane thereof, said fuel tank having its barrel extended beyond its front wall so as to constitute a sheltered space for the reception of the machinery for operating said tank.

3. A locomotive tender comprising a substantially cylindrical fuel tank arranged on said tender with its axis in the vertical central plane thereof, said fuel tank having its barrel extended beyond its front wall so as to constitute a sheltered space for the reception of the machinery for operating said tank, and boxes for the reception of tools and the like arranged in said sheltered space.

4. A locomotive tender comprising a substantially cylindrical fuel tank arranged with its axis in the vertical plane of said tender, mechanical fuel conveying means in said tank, pneumatic fuel conveying means connected with said mechanical means, and an engine for operating said mechanical and pneumatic means.

5. A locomotive tender comprising a substantially cylindrical fuel tank arranged with its axis in the vertical plane of said tender, mechanical fuel conveying means in said tank, pneumatic fuel conveying means connected with said mechanical means, an engine for operating said mechanical and said pneumatic means, a water pump, gearing operatively connecting said pneumatic means and said pump with said engine, and means for making and breaking the operative connection of said engine with said mechanism and with said pump.

6. A locomotive tender comprising a substantially cylindrical fuel tank arranged with its axis in the vertical plane of said tender, mechanical fuel conveying means in said tank, pneumatic fuel conveying means connected with said mechanical means, an engine for operating said mechanical and pneumatic means, said pneumatic means comprising a blower adapted to be operated by said engine and arranged above the machinery in a shelter formed by an extension of the barrel of said tank beyond its front wall.

7. A locomotive tender comprising a cylindrical fuel tank arranged with its axis in the vertical central plane of said tender, a pair of parallel rotary conveyers arranged in said tank and extending substantially throughout its length, and means for imparting rotation to said conveyers in the same direction.

8. A locomotive tender comprising a cylindrical fuel tank arranged with its axis in the vertical central plane of said tender, a pair of parallel rotary conveyers arranged in said tank and extending substantially throughout its length, means for imparting rotation to said conveyers in the same direction, and a slotted casing surrounding each conveyer.

9. A locomotive tender comprising a cylindrical fuel tank arranged with its axis in the vertical central plane of said tender, a pair of parallel rotary conveyers arranged in said tank and extending substantially throughout its length, means for imparting rotation to said conveyers in the same direction, and a casing with a longitudinal slot surrounding each conveyer.

10. A locomotive tender comprising a cylindrical fuel tank arranged with its axis in the vertical central plane of said tender, a pair of parallel rotary conveyers arranged in said tank and extending substantially throughout its length, means for imparting rotation to said conveyers in the same direction, and a casing surrounding each conveyer and being slotted to the extent of about one-quarter of its perimeter.

11. A locomotive tender comprising a cylindrical fuel tank arranged with its axis in the vertical central plane of said tender, a pair of parallel rotary conveyers arranged in said tank and extending substantially throughout its length, means for imparting rotation to said conveyers in the same direction, and a casing surrounding each conveyer and being slotted to the extent of about one-quarter of its perimeter, the upper edge of the slot extending substantially in the vertical central plane of said conveyer.

12. A locomotive tender comprising a cylindrical fuel tank arranged with its axis in the vertical central plane of said tender, a pair of parallel rotary conveyers arranged in said tank and extending substantially throughout its length, an auxiliary conveyer extending between said two conveyers, means for imparting rotation to all said conveyers, and means for making and breaking the operative connection of each conveyer with said rotation imparting means.

13. A tender for pulverized fuel locomotives comprising a cylindrical fuel tank arranged with its axis in the vertical central plane of said tender, a water tank, screw conveyers arranged within said fuel tank, a pump associated with said water tank, and an engine for driving said conveyers and pumps.

14. A tender for pulverized fuel locomotives comprising a cylindrical fuel tank arranged with its axis in the central vertical plane of said tender, screw conveyers arranged within said fuel tank, an engine for driving said conveyers, and boxes arranged laterally of said engine, said boxes and an extension of the barrel of said tank forming a shelter for said engine.

15. A tender for pulverized fuel locomotives comprising a cylindrical fuel tank arranged with its axis in the vertical central plane of said tender, the length of said tank being substantially equal to the wheel base of said tender, rotary conveyers arranged within said tank and extending substantially throughout its length, means for imparting rotation to said conveyers, and a slotted casing surrounding each conveyer, the slots being distributed along the length of the conveyers to afford means for uniform unloading of said fuel tank.

In testimony whereof I affix my signature.

WALTER KLEINOW.